March 13, 1951  C. F. CRAWFORD ET AL  2,545,344
SHAFT CUTTING AND CENTERING MACHINE
Filed Dec. 26, 1946  5 Sheets-Sheet 1
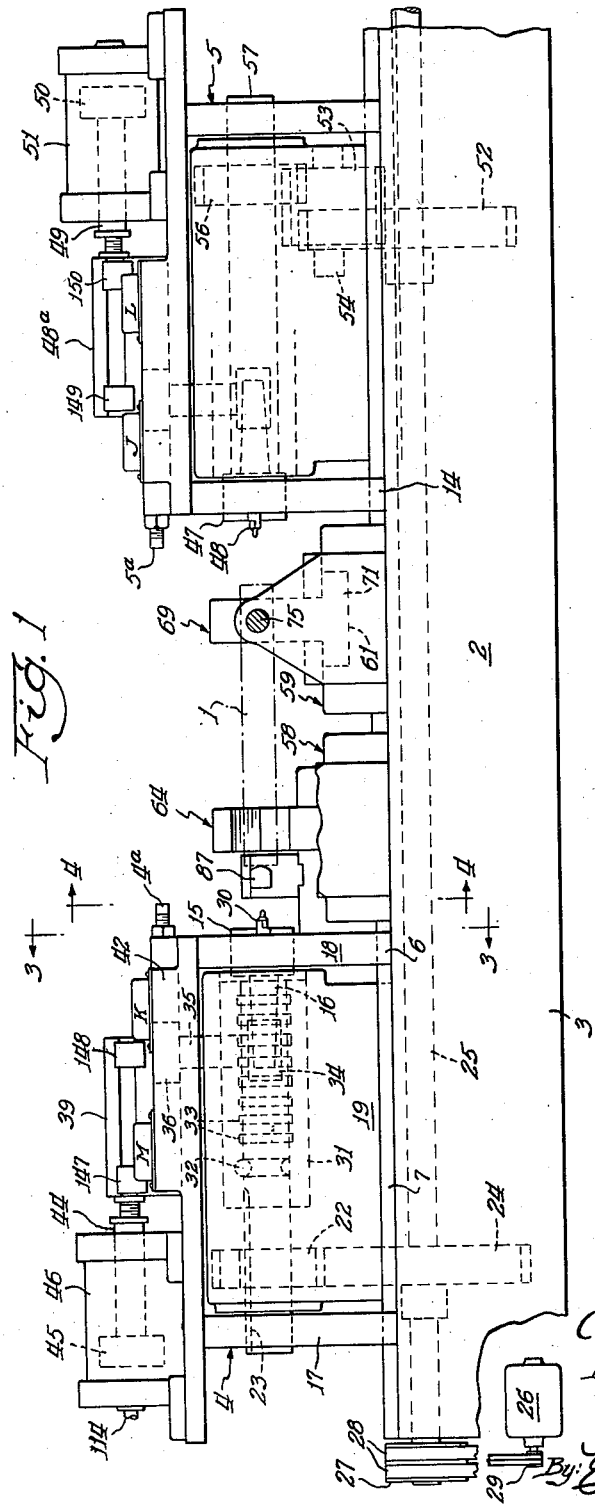
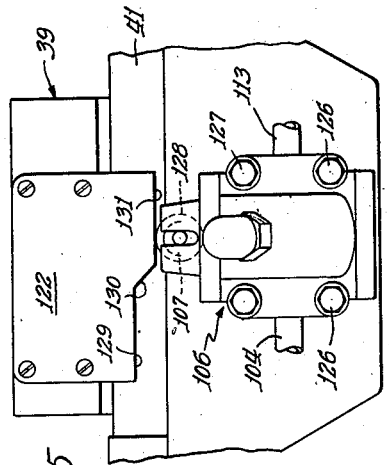
Inventors:
Charles Frederick Crawford
Hallie Alton Potts and
George V. Price

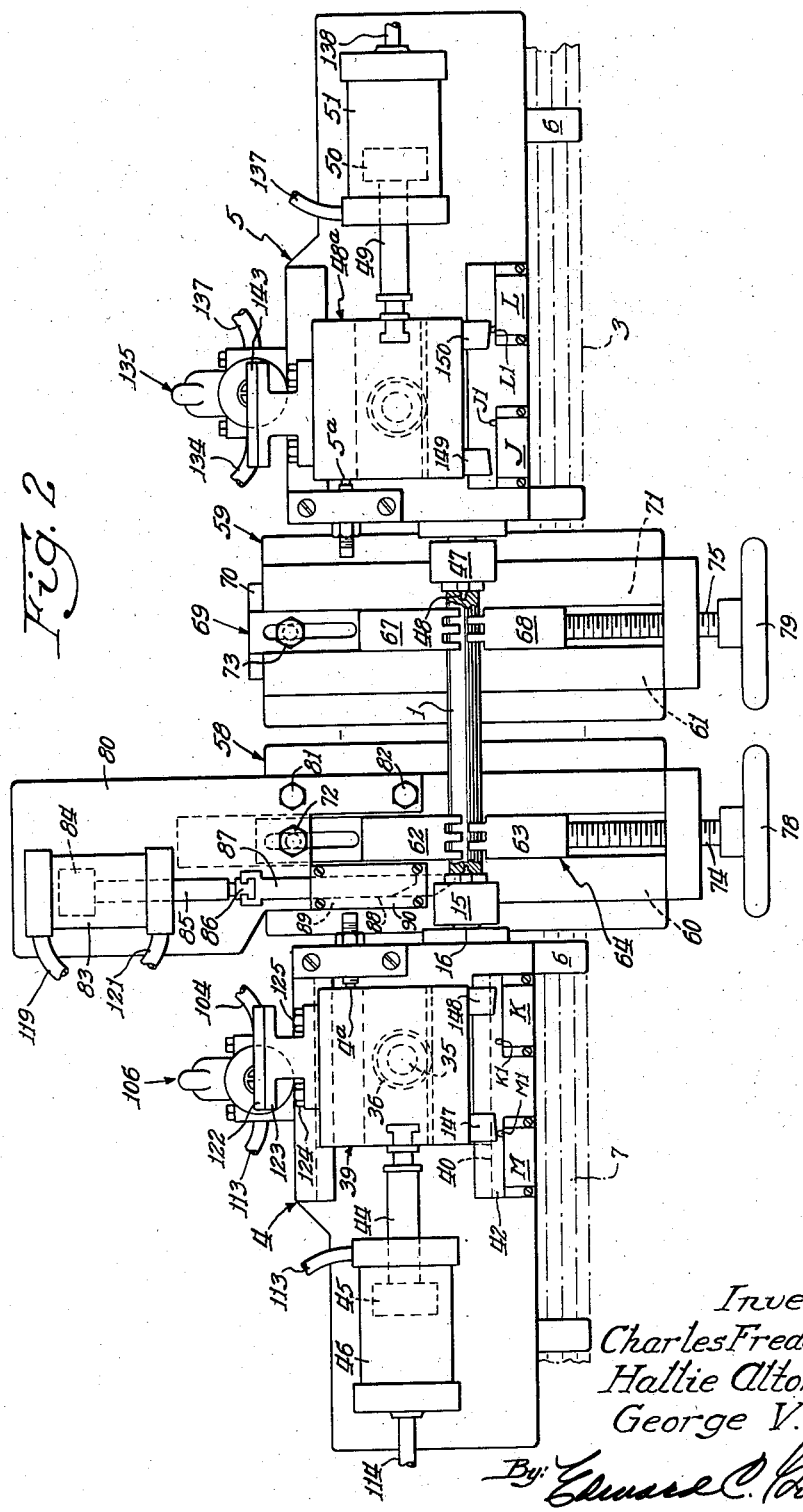

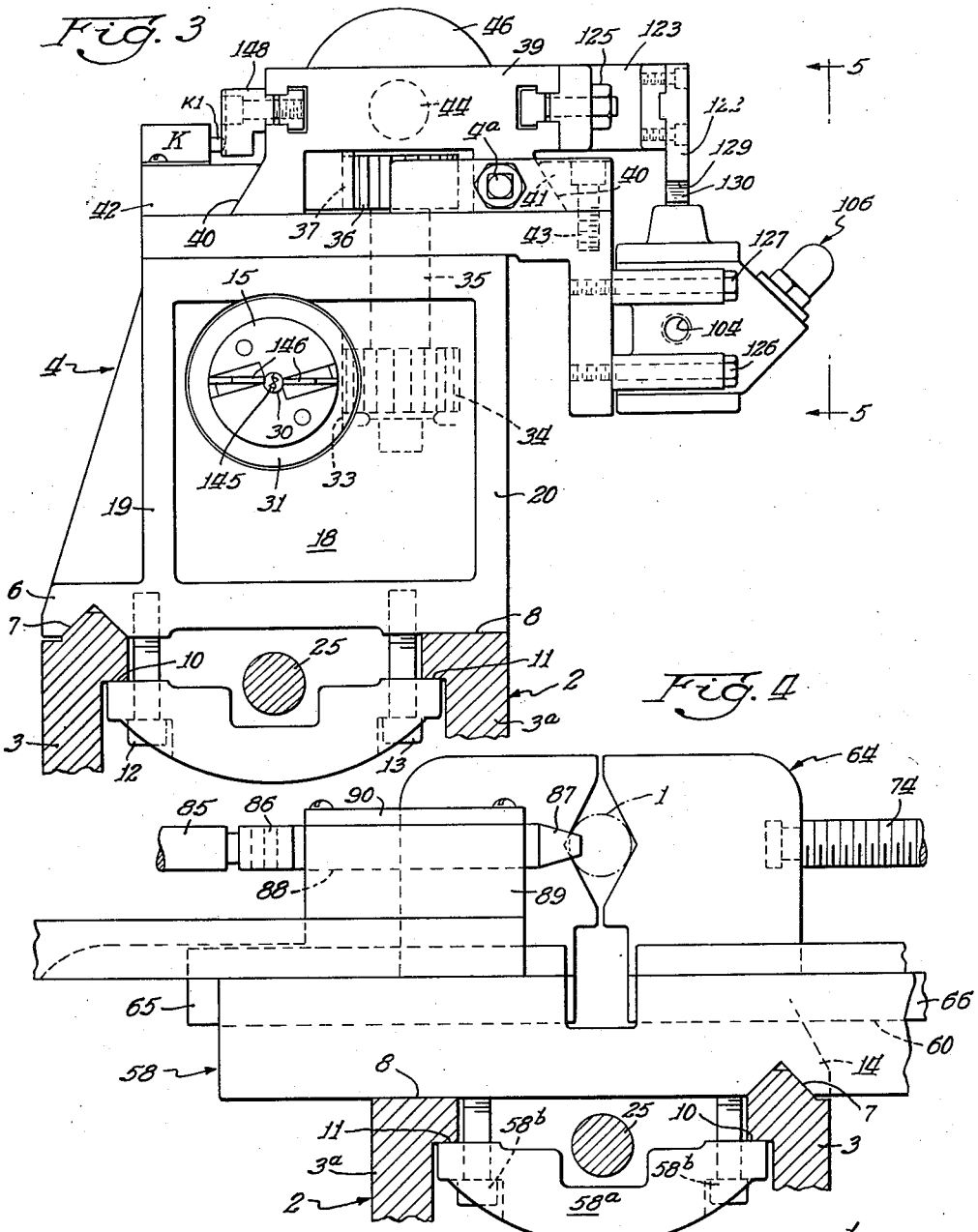

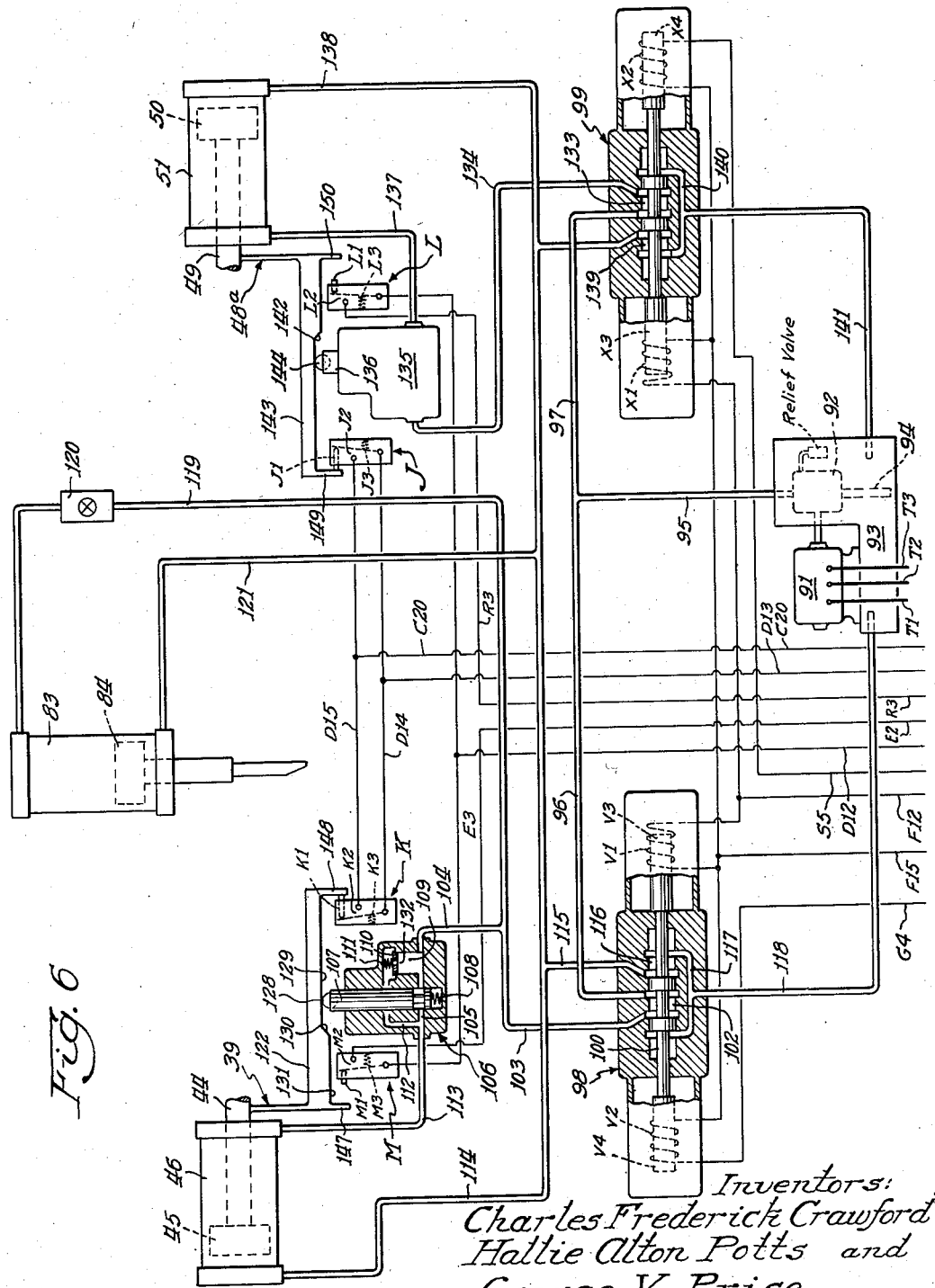

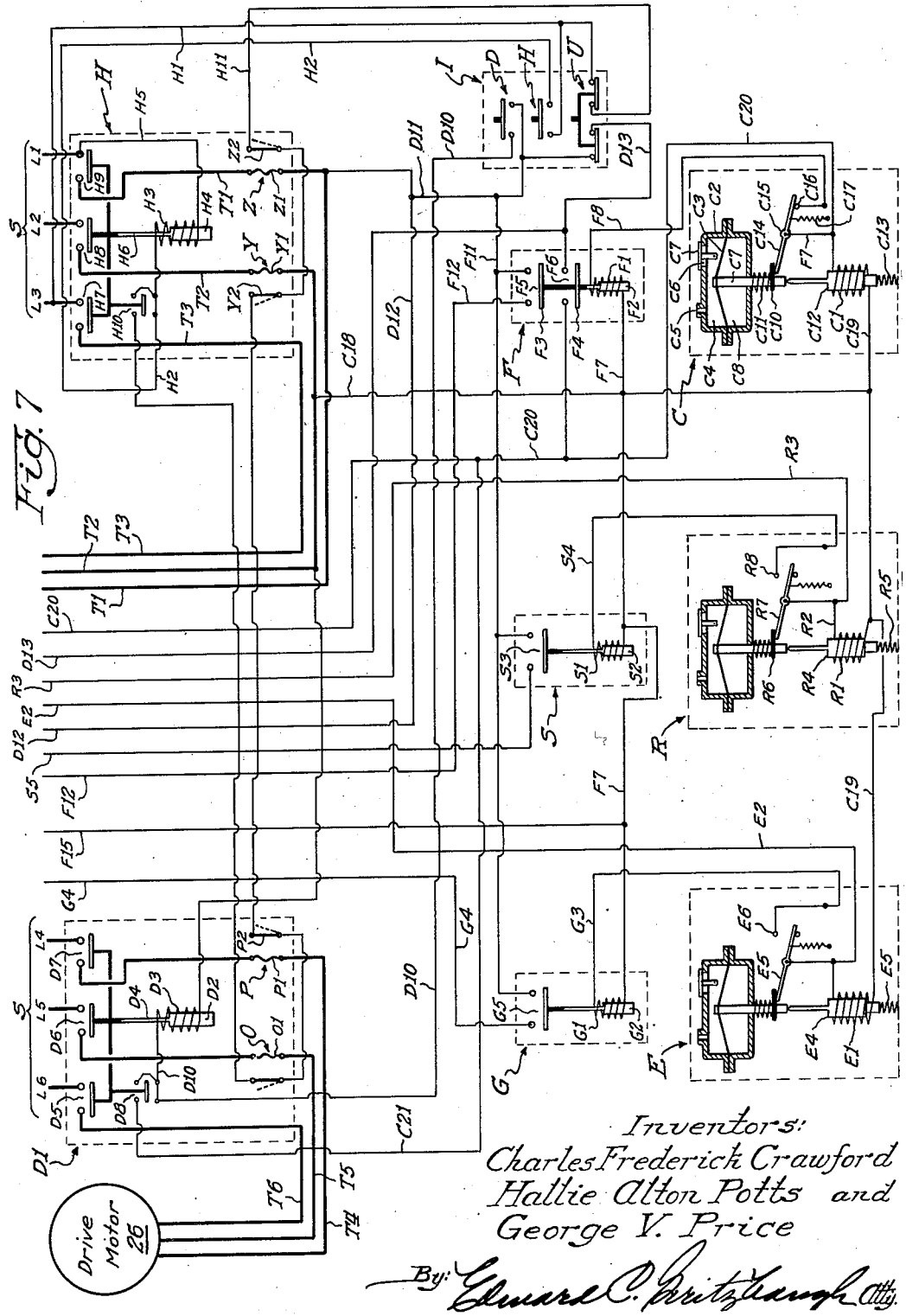

Patented Mar. 13, 1951

2,545,344

UNITED STATES PATENT OFFICE 2,545,344

SHAFT CUTTING AND CENTERING MACHINE

Charles Frederick Crawford and Hallie Alton Potts, Muncie, and George V. Price, Parker, Ind., assignors to Borg-Warner Corporation, Chicago, Ill., a corporation of Illinois Application December 26, 1946, Serial No. 718,568

2 Claims. (Cl. 77—18)

The present invention relates to shaft cutting and centering machines and is directed to an improvement of the machine for cutting and centering the ends of a shaft shown and described in the copending United States application Serial No. 718,366 of Harry N. Baney, Louis Allen C. Slentz, and Arlo A. Kirkpatrick, filed December 26, 1946.

In the aforesaid copending application, the shaft cutting and centering machine incorporates tools disposed at opposite ends of a shaft and adapted to be selectively operated for simultaneous or independent movement into cutting engagement with the ends of the shaft to provide a shaft of a desired length while performing a centering operation on the cut ends of the shaft, each tool being movable by an associated power means having manually operable control means to effect operation of the same to advance and retract the tool to and from cutting engagement with the adjacent shaft end. The general object of the present invention is to provide, in a machine such as described, means adapted to automatically govern operation of the respective control means for the power means to effect simultaneous actuation thereof to advance the tools into engagement with the ends of the shaft and to effect actuation of the power means independently of each other at the end of the work operation of each tool so that each tool will be retracted from the shaft only after it has satisfactorily performed its work operation on the adjacent shaft end.

Another object is to provide, in a machine as described above, means initiated at the end of the cutting and centering operations of the tools on the shaft for momentarily preventing operation of the power means to effect retracting movement of the tools so as to maintain the rotating tools in engagement with the shaft to perform a facing operation on the cut ends of the shaft.

A further object of the invention is to provide, in a machine of the type indicated above, means operative to automatically discontinue operation of the machine upon completion of the work operations on the shaft to thereby prevent wear of the operating parts of such machine.

A different object of the invention is to provide, in a machine of the type indicated above wherein movement of the tools to and from cutting engagement, and also rotation of the tools, are effected respectively by a plurality of power means connected to a power source and each having control means responsive to excess energy flow to deenergize the associated power means as well as the other power means.

A further object of the invention is to provide, in a machine such as described, means for simultaneously stopping the tool-rotating and moving power means at any time during the operation of the machine at the will of the operator.

Another object of the invention is to provide, in a combined cutting and centering machine of the type indicated above and wherein the power means for advancing and retracting the tools include a pump driven by an electric motor and the power means for rotating the tools comprises an electric motor, an electrical control system for the motors featuring means responsive to an overload on either of the electric motors or on the wiring leading to either of the motors to deenergize both of the motors during the operation of the machine.

Other objects, the advantages and uses of the invention will become apparent after reading the following specification and claims, and after consideration of the drawings forming a part of the specification, wherein:

Fig. 1 is a longitudinal side elevation of a cutting and centering machine embodying the present invention;

Fig. 2 is a top plan view of the machine shown in Fig. 1;

Fig. 3 is a transverse vertical section taken on the plane of line 3—3 of Fig. 1, looking in the direction of the arrows or toward one of the toolheads of the machine;

Fig. 4 is another transverse vertical section, taken on the plane of line 4—4 of Fig. 1, looking in the direction of the arrows or toward the shaft-supporting portion of the machine;

Fig. 5 is a side elevation of the speed-controlling mechanism for the toolheads shown in Fig. 3 and taken on the plane indicated by the line 5—5 of Fig. 3; and Figs. 6 and 7, taken together, diagrammatically and partly in section, illustrate the details of the fluid circuit for the operating mechanism and also the details of the electrical control circuits.

The drawings are to be understood as being more or less of a schematic character for the purpose of disclosing typical or preferred forms of the improvement that are contemplated herein, and in these drawings like reference characters identify the same parts throughout the several views.

Description of operating mechanism of the machine

The shaft-cutting and centering machine shown and described in the aforesaid copending application is adapted to cut the ends of a shaft 1 to provide a shaft of a predetermined desired length and also to accurately center the ends of the shaft to afford a guide for the subsequent assembly of the shaft with other mechanisms. Said machine includes an elongated table 2 that is provided with spaced parallel vertical walls 3 and 3a for supporting and guiding the headstocks generally indicated at 4 and 5 to bodily allow reciprocation of the same as desired in directions longitudinally of the table toward and away from the ends of the shaft 1 positioned therebetween in a manner now to be described.

As the construction of the headstocks 4 and 5 is similar, it is believed that a detailed description of only one of them is necessary for the purpose of this disclosure. The headstock 4 comprises a base or saddle 6 that straddles the table and engages the upper surfaces 7 and 8 of the walls 3 and 3a of the table as shown in Fig. 3, the surface 7 being of dovetail design to guide the headstocks in their movement longitudinally of the table. Thus the headstock may be adjusted longitudinally of the table and thereafter secured against movement, as shown in Fig. 3, by a yoke 9 having engagement with shoulders 10 and 11 of the walls 3 and 3a of the table and, after adjustment of the headstock, maintaining the table and headstock in fixed relation by bolts 12 and 13 entered into openings in the yoke and having threaded engagement with the headstock to clamp the headstock to the table 2. Headstock 5 is mounted in an identical manner on the table 2 and comprises the base or saddle 14 engaging the surfaces 7 and 8 of the table 2 for adjusting movement longitudinally of the table and thereafter to be secured thereto against such movement in the same manner as the headstock 4.

The headstocks 4 and 5 are each equipped with a head or chuck carrying a cutting and centering tool and adapted to be rotatably mounted in the headstock and to be moved toward the adjacent end of the shaft 1. Referring to the conventional mounting of the headstock 4 for rotation, and viewing Figs. 1 and 3, it may be noted that the chuck 15 has its spindle 16 rotatably mounted in the end walls 17 and 18 of the headstock and between the side walls 19 and 20 thereof, the spindle 16 having a gear 22 rotatable therewith by means of its engagement with a spline 23 extending longitudinally of the spindle, said gear meshing with a gear 24 secured to a spindle 25 rotatably mounted in the table 2 and having an operative connection to a motor 26 by means of a pulley 27 and belts 28 having driving connection with a pulley 29 operated by the motor 26 whereby the chuck 15 and its associated cutting and centering tool 30 is rotated. The movement of the chuck 15 and tool 30 longitudinally of the table toward and from the adjacent end of the shaft is effected by means of a sleeve 31 surrounding the spindle 16 and connected thereto for obtaining said movement by means of an annular stud 32 received within a circumferential groove on the spindle and a groove interiorly of the sleeve 31. Thus, movement of the sleeve 31 longitudinally of the table will cause similar movement of the spindle 16 and chuck 15. To effect such movement, the side of the sleeve 31 is formed with teeth 33 to provide a rack engageable with a pinion or gear 34 secured to a vertical shaft 35 journaled in the walls of the headstock and having at its upper end a gear 36 fixed thereto and meshing with teeth 37 interiorly of and on a rack 39 having a lower portion of dovetail design slidable on the top wall of the headstock 4 and presenting exterior end surfaces engageable as at 40 by complementary surfaces of retaining or guide pieces 41 and 42 secured to the upper wall of the headstock by bolts 43 and adapted to guide the rack 39 longitudinally of the table while preventing transverse movement thereof. The rack 39 is secured by means of a threaded coupling to a piston rod 44 having a piston 45 adapted to be moved in opposite directions in a cylinder 46 by pressure-fluid-operated means as hereinafter described. It will be apparent from the foregoing description that, upon movement of the piston 45 to the right, the rack 39 will be thereby actuated in the same direction to rotate the gear 36 and thereby the gear 34 to effect movement of the sleeve 31 by the gear 34 to the right and through the intermediary of the stud 32 to also effect movement of the spindle 16 and chuck 15 to the right, the stud 32 permitting the continued rotation of the spindle 16 and chuck 15 due to the splined connection of the gear 22 to the spindle 21 which permits the gear 22 to remain in constant mesh with the gear 24 driven by the motor, despite the aforesaid movement of the spindle 16, chuck 15 and its associated tool 30 toward the adjacent end of the shaft.

The headstock 5 comprises a chuck 47 and an associated cutting and centering tool 48, which are mounted for rotation and also for movement longitudinally of the table 2 by gear and rack mechanism similar to that associated with the chuck 15, the rack 48a being connected to and actuated by a piston rod 49 and piston 50 in a cylinder 51 mounted on the upper wall of the headstock 5, the piston being actuated by fluid pressure as hereinafter described to reciprocate the chuck and tool to and from the adjacent end of the shaft. However, as it is desirable to interchangeably and indiscriminately use the same tools for both chucks which necessitates driving the chucks 15 and 47 and their associated tools in opposite directions of rotation, the driving gear 52 on the spindle 25 meshes with a gear 53 of a reversing gear set, the gear set also including a shaft 54, the gear 53 also meshing with a gear 56 secured to a spindle 57 for rotating the same and its associated chuck 47 in a direction opposite to that of the direction of rotation of the chuck 15. As seen in Fig. 2, the limits of travel of the respective chucks and their tools are determined by means of adjustable stops 4a and 5a threaded into brackets fixed to the top walls of the headstocks 4 and 5 and adapted to engage the racks 39 and 48a to stop movement thereof and thereby the tools toward each other at the completion of the cutting and centering operation.

Mounted on the table 2 are a pair of slides 58 and 59 each having movement longitudinally of the table and, for this purpose, slidably engaging the upper surfaces 7 and 8 of the walls 3 and 3a of the table 2, as shown in Fig. 4. While the slides 58 and 59 may be moved longitudinally of the table 2, if desired, they are normally maintained in fixed spaced relationship to each other and to the adjacent headstocks 4 and 5 by clamping pieces or yokes associated therewith such as the yokes 58a shown in Fig. 4 which engages the shoulders 10 and 11 of the walls 3 and 3a of the table 2 and secures the slides 58 and 59 thereto by the clamping action obtained by bolts 58b.

The slides 58 and 59 are provided with longitudinal ways 60 and 61, each way slidably receiving a pair of gripping jaws of an equalizing vise for permitting movement of the same in a direction transverse to the movement of the headstock to position the axis of the shaft in alignment with the tools 30 and 47 for the cutting and centering operation. As clearly shown in Figs. 2 and 4, the jaw members 62 and 63 of the equalizing vise, generally designated 64, are of inverted T-shaped design in end elevation and are provided with bases 65 and 66 recessed within the way 60 of the slide 58 and the jaw members 67 and 68 of the equalizing vise indicated at 69 are of similar design providing bases 70 and 71 received within the way 61 of the slide 59, said jaw members of said vises being movable to receive therebetween the shaft 1, the jaws 62 and 67 being movable to positions to center the shaft with respect to the tools 30 and 48 for axial alignment therewith, whereupon the jaws 62 and 67 may be secured by means of bolts 72 and 73, received within slots in the jaws, to the slides 58 and 59 whereupon the other jaws 63 and 68 of the respective vises may be brought into engagement with the shaft by the threaded shafts 74 and 75 threaded in end walls of the slides 58 and 59 and rotatable by means of the hand wheels 78 and 79 fixed to the respective shafts for rotating the same. It will be apparent from this description of the vises 64 and 69 that the same are capable of locating the shaft 1 in axial alignment with the cutting and centering tools 30 and 48 for operation of the tools thereon.

In the embodiment of the invention shown in the drawings, means are provided for locating the shaft 1 in a predetermined spaced relationship between the cutting tools 30 and 48 so that the ends of the shaft will be positioned substantially equidistant from the cutting tools. To this end, a plate 80 on the slide 58 is affixed to the top thereof and at one side of the equalizing vise jaw 62, by bolts 81 and 82. The plate has secured thereto a cylinder 83 by any suitable means and having a piston 84 therein actuated by fluid pressure as hereinafter described and connected by a piston rod 85 and coupling 86 to a locating bar 87 which, as shown in Figs. 2 and 4, is adapted to slidably extend through an elongate opening 88 in a guide block 89, having a retaining plate 90 secured thereto, and into the path of the shaft 1 for engagement with the left end of the shaft to thereby locate the ends of the shaft equidistant from the cutting tools 30 and 48, as shown in Figs. 1 and 2.

*Description of the hydraulic circuit for the operating mechanism of the machine*

The chucks 15 and 47 of the headstocks 4 and 5, respectively, are movable into and out of engagement with opposite ends of the shaft 1 by the gear and rack mechanisms previously described which are operated by the pistons 45 and 50 in the cylinders 46 and 51 forming a portion of the hydraulic system now to be described and shown in schematic illustration in Fig. 6. Referring to Fig. 6, it may be noted that a power source such as the motor 91 is utilized to drive a pump 92 which draws fluid from a sump 93 through a pipe 94 and pumps the fluid under pressure into a conduit 95 connected to branch conduits 96 and 97 respectively leading to valves generally indicated 98 and 99 of two way valve design controlling the pressure fluid to effect movement of the tools into and out of cutting engagement with the ends of the shaft, as well as to move the locating bar 87 to and from the shaft. The valve 98 controls the movements of the piston 45 to advance and retract the cutting tool 30 relative to the adjacent end of the shaft and also controls the movements of the piston 84 to actuate the locating bar 87 toward and from the shaft. The valve 99 is effective to control the movements of the piston 50 to advance and retract the cutting tool 48 relative to the adjacent end of the shaft. The valves 98 and 99 are operable to effect simultaneous tool-advancing or tool-retracting movements of the pistons 45 and 50 and to effect selective movements of the pistons for retracting one of the tools from cutting engagement with the adjacent end of the shaft while the other tool may be advancing in cutting engagement with the other end of the shaft, as described hereinafter.

In the position of the spool valve bodies 100 and 101 of the valves 98 and 99, respectively, shown in Fig. 6, the valve bodies 100 and 101 have been moved to the right to control the pressure fluid from the conduits 96 and 97 to effect simultaneous actuation of the pistons 45 and 50 in their cylinders 46 and 51, respectively, to retract the tools from cutting engagement with the shaft at the end of the cutting and centering operation shown in Fig. 2 to their initial inactive positions shown in Fig. 1 and also to effect operation of the piston 84 in the cylinder 83 to move the locating bar 87 from its retracted position to shaft-engaging position. Referring first to the position of the valve body 100 of the valve 98, it will be seen that the flow of pressure fluid from the conduit 96 is directed through the valve passage 102 to the conduit 103, branch conduit 104, through passage 105 of the speed-control valve 106 wherein valve body 107 is raised by a spring 108 to allow flow around a reduced portion of said body 107 to conduit 135, and which valve 106 also comprises a branch passage 109 for the fluid which fluid under pressure is effective to raise the check valve 110 against the pressure of its spring 111 to allow flow of the fluid to passage 112, spaced from the valve body 107, to the passage 105 and thence to the cylinder 46 by the conduit 113, to effect rearward movement of the piston 45 and piston rod 44 therein to withdraw the tool 30 and maintain it in its inactive position. The fluid evacuated from the cylinder 46 by the rearward movement of the piston 45 flows through the conduits 114 and 115 to the valve passages 116 and 117 and to the return conduit 118 leading to the sump 93.

It may be noted that, in the described hydraulic circuit, the conduit 103 has a branch conduit 119 having a manually operable valve 120 in open position to allow the flow of the fluid to the cylinder 83 to move the piston 84 thereby the work-locating bar 87 toward its shaft-engaging position, the fluid expelled from the cylinder 83 by the aforesaid movement of the piston 84 flowing through the conduit 121 to conduits 114 and 115 which are connected as previously described to the sump 93.

To advance the chuck 15 and its tool 30 to cutting engagement with the adjacent end of the shaft 1, the valve body 100 is moved to the left to direct the flow of the pressure fluid to the rear of the piston 45 to actuate the same, the pressure fluid from the pump and conduit 96 flowing through the passage 116 by reason of the changed position of the valve body and thence to the conduits 115 and 114 to the cylinder 46 to actuate the piston 45 and the piston rod 44 to move the chuck 15 and its tool 30 toward and into cutting engagement with the shaft.

To permit the chuck 28 and its tool 30 to be quickly moved toward the end of the shaft and thereafter to move slowly into cutting engagement with the shaft and also during the cutting operation, a cam plate 122 is suitably secured to the movable rack 30 by means of a mounting member 123 and bolt and nut assemblies 124 and 125, the cam plate 122 being adapted to actuate the speed-control valve 106 to achieve this desirable result in a manner now to be described. Referring to Figs. 3 and 5, it will be noted that the valve 106 is secured to a downwardly extending portion of the headstock 4 by bolts 126 and 127 so that the roller 128 on the valve body 107 of the valve 106 engages the bottom of the cam plate 122 mounted on the movable rack 29. In the position of the various fluid-operated and fluid-control means illustrated in Fig. 6, and prior to the actuation of the valve body 100 of the valve 98 to the right to direct the flow of fluid through the conduit 114 to the piston 45 to actuate the same to engage the tool 30 with the shaft, the valve body 107 of the valve 106 is in its open position to allow free flow of the pressure fluid from the cylinder 46 through the passage 105 of the valve 106 to the sump. Upon movement of the valve body 100 to the right to direct the flow of the pressure fluid to the rear of the piston 45 to advance the tool 30 to shaft-engaging position, the horizontal portion 129 of the cam plate 122 will be ineffective to actuate the valve body 107 to restrict the free flow of the pressure fluid through the passage 105 of the valve 106 and the piston 45 will rapidly advance the tool 30 toward the adjacent end of the shaft. However, as the roller 128 engages the inclined cam portion 130 and horizontal portion 131 of the plate 122, the valve body 127 will be rapidly moved downward against the action of its spring 108 to cut off the flow of the pressure fluid through the passage 105 to the sump and the fluid will thereupon flow through the passage 112 and, as the spring 111 and the fluid pressure has urged the check valve 110 to its closed position, the fluid will be constrained to flow through the small opening 132 in the valve 110 and into the passage 102 of the valve 106 to the conduit 104 and the sump, the practical effect of this phase of operation of the valve 106 being to restrict the free flow of the fluid from the cylinder 46 to check the rapid advance of the piston 45 and thereby to advance the tool 30 slowly into initial cutting engagement with the shaft and during the cutting operation.

The position of the valve body 100 of the valve 98 in its tool-advancing position as above described is also instrumental to effect flow of the pressure fluid to the cylinder 83 through the conduit 115, conducts 114 and 121 to cause the piston 84 in the cylinder 83 to retract the locating bar 87 from engagement with the end of the shaft; the fluid expelled from the cylinder by the movement of the piston flowing through the conduit 119 to the conduit 103 and passage 116 to the sump. The surfaces 129, 130 and 131 of the cam plate 122 are proportioned in such manner with respect to each other that the valve body 128 of the valve 106 will be actuated to close the passage 105 in the valve 106 to retard movement of the piston 45 and thereby the tool before the tool is sufficiently advanced to engage the locating bar 87 so that the latter will be withdrawn completely from the shaft at the time the tool approaches the shaft to begin cutting and centering of the adjacent shaft end.

The hydraulic system for advancing and retracting the chuck 47 and its tool 48 to and from cutting engagement with the adjacent end of the shaft is similar to that described for obtaining similar movements of the chuck 15 and its tool 30 as will be apparent from an inspection of Fig. 6. Considering the hydraulic system for the tool 48, the valve 99, as previously described, is instrumental to control the flow of the pressure fluid from the pump to the piston 50 to reciprocate the same to advance and retract the tool 48. It will be noted that, in Fig. 6, the valve body of the valve 99 has been moved to the right whereby the pressure fluid is operative to maintain the piston 45 in its tool-retracting position, the pressure fluid flowing from the pump through the conduit 97 to the valve passage 133 of the valve 99, conduit 134, and through the speed-control valve 135, identical with valve 106 and thereby allowing free flow of the fluid inasmuch as its valve body 136 is in its raised position to the conduit 137 to the cylinder 51 to the piston 50, the fluid expelled by the piston flowing from the cylinder 51 through the conduit 138 to the passages 139 and 140 in the valve 99 to the conduit 141 connected to the sump.

Upon movement of the valve body 101 of the valve 99 to the left to direct the pressure fluid to actuate the piston 50 to move the chuck 47 and tool 48 toward and into cutting engagement with the adjacent end of the shaft, the pressure fluid will be directed from the conduit 97 to the passage 139 of the valve 99 to the conduit 138 and the cylinder 51 to exert pressure on piston 50 and move the same forward to advance the tool 48 to its shaft-cutting and centering position. Due to the pressure of the fluid entering the cylinder 51 from the conduit 138, the piston 50 will expel the fluid at the left thereof in the cylinder to the conduit 137 and valve 135, which valve permits the free flow of the fluid to allow the rapid movement of the piston 50 and thereby the tool 48 toward the adjacent end of the shaft until the cam portion 142 of the cam plate 143, mounted on the rack 48a and similar to that of the cam plate 122 on the rack 39, engages the roller 144 of the valve body 136. At this time, the valve body 136 will be urged downwardly by the cam plate to reduce the flow of fluid through the valve 135 to substantially decrease the speed of travel of the piston 50 and thereby the tool 48 into cutting engagement and during such engagement with the adjacent end of the shaft. Upon the passage of the fluid through the valve 135, the fluid will flow through the conduit 134, the passages 133 and 140 of the valve 99, to the conduit 141 and the sump 93. It will be seen from the foregoing that the instrumentalities and operation of the hydraulic system for the advancement and retraction of the cutting and centering tool 48 is identical to that of the hydraulic system for the operation of the tool 30.

The cutting and centering tool 30 shown in Fig. 3 is identical with the tool 48 and comprises the centering bit 145 engageable with the end of the shaft along its axis to center the same and also comprises the cutting blades 146, 146 adapted to cut the end of the shaft to obtain a shaft of a predetermined desired length.

In the event, a shaft is of the predetermined desired length and within acceptable tolerances required so that it is not necessary to cut the ends of the shaft by the machine, the cutting blades of each tool 30 and 48 may be removed and the machine can then be utilized to merely center the shaft. In such case, the necessity for utilizing the shaft-locating bar is dispensed with and it may be retained in its retracted position by disconnecting the cylinder 83 from the conduit 119 by operating the valve 120 to prevent the flow of pressure fluid to the cylinder 83 and actuation of the piston 84 to advance the locating bar 87 to its shaft-engaging position.

*Description of the electrical control circuits*

The present invention is directed to the provision of electrical means for controlling the operation of the machine, such as automatically controlling the movement of the solenoid-operated valves 98 and 99 to advance and retract the tools and locating bar to and from the shaft, effecting deenergization of the operating mechanism of the machine automatically at the end of the work operation, and stopping the operating mechanism of the machine at any time at the will of the operator and also automatically in the event either the drive or hydraulic motors draw more than normal line current as would be the case of an overload occurring on the motor or on the wires supplying current to the windings of the motor.

The electrical circuits actually applied in effecting automatic operation of the machine involves a very complicated system of relays and the like, and since it is largely condensed in its detailed aspects, the electrical circuits have been shown diagrammatically in Figs. 6 and 7 in combination with a diagrammatic view of the hydraulic fluid circuit.

Referring to the electrical circuit diagram, to effect operation of the motor 91 and thereby the pump 92 to supply pressure fluid to the hydraulic circuit, the starting switch H at the push button station I is closed to establish a circuit for energizing the starting box H' for the motor 91, this circuit extending from the lead L3 of the source of supply indicated at S of direct current to the wire H1 to the closed contacts of the switch H at the station I to the wire H2 to the relay magnet coil H3 surrounding a relay core H4 of the starting box H' to the wire H5 connected to the wire L1 of the power supply S whereby the coil H3 is energized to raise the core H4 and thereby the rod H6 carrying tandem-linked armatures engageable with and adapted to close the power circuit contacts H7, H8, H9 to establish circuits for the flow of current from the wires L1, L2, L3 of the power source to the wires T1, T2, T3 connected respectively to the windings of the electric motor 91 to energize the same for operating the pump 92. As it is desirable to maintain the electric motor 91 continuously operating during the use of the machine after the release of the switch H, a holding circuit is provided for insuring continued energization of the coil H3 to maintain the contacts H7, H8, H9 closed and thereby the motor 91 operative, this circuit being established by the raising of the core H4 and thereby the rod H6 to effect movement of the armature associated with the contacts H10 to close the latter simultaneously with the closing of the power circuit contacts upon energization of the magnet coil H3. The holding circuit for maintaining the coil H3 energized for the purpose described comprises the wire L1 connected to the power supply S, wire H5, coil H3, wire H2, contacts H10, wire H11, the closed contacts at the right side of the stop switch U, wire H1, to the wire L3 connected to the power supply S.

The motor 91 is now operating to drive the pump 92 to supply fluid under pressure to the hydraulic circuit. At this time, a shaft may be mounted in the equalizing vises between the tools with one end of the shaft abutting the locating bar. The switch D at the push button station I is thereafter closed to effect the automatic sequence of operations hereinafter described.

The closing of the switch D is initially effective to start the drive motor 26 for rotating the chucks and their associated tools by the operative connection between the motor and chucks as previously described. For this purpose, the momentary closing of the switch D energizes the starting box D' for the motor by establishing a circuit for energizing the relay magnet coil D3 to raise the relay core D2 and thereby the rod D4 carrying tandem-linked armatures engageable with and adapted to close contacts D5, D6, D7 to establish circuits from the wires L4, L5, L6 of the power supply S to the wires T4, T5, T6 connected to the windings of the drive motor 26 to energize the motor to rotate the tools, the circuit for energizing the coil D3 comprising the power supply S, the wire L2, closed contact H8 of the starting box H', wire T2, wire D9, coil D3, wire D10, closed switch D of the station I, wires D11 and D12, wire T1, contact H9, and conductor L1 of the power supply S. Inasmuch as the release of the drive button D will interrupt the circuit energizing the coil D3 and thereby the core D4 to open the contacts D5, D6, D7 to deenergize the motor 26, a holding circuit including the contacts D8, which is now closed by an armature associated therewith and the rod D4, will be immediately established for insuring the continuous energization of the coil D3 and thereby the operation of the drive motor 26 after the drive button is released, this circuit being hereinafter described.

The closing of the switch D is also instrumental in energizing, simultaneously with the energization of the drive motor 26, the relay generally designated C and, as a result, the relay F, as well as energizing the solenoid-operated valves 98 and 99 to effect movement of the valve bodies 100 and 101 of said valves to direct the pressure fluid from the pump to the cylinders 46 and 51 to actuate the pistons 45 and 50, respectively, therein toward each other and thereby the tools into cutting engagement with the ends of the shaft and also to direct the fluid to the cylinder 83 to move the piston 84 therein to retract the shaft-locating bar from the shaft 1.

The purpose of the relay C is to allow the operator to start the machine by closing the switch D at the station I without necessitating the operator holding the button down for any length of time, the momentary closing of the switch resulting in the automatic sequence of operations of the machine by the electrical control circuits hereinafter described. Referring to the relay C, this relay is of the pneumatic measured, time delay type which, as shown in Fig. 7, comprises the cylinder C2 having mounted therein a diaphragm C3 to divide the cylinder into an upper air chamber C4, having a small air inlet C5 and large air outlet C6 closed by a valve C7, and a lower chamber C8 in which is received a rod C9 slidably received within the bottom wall of the casing and having one end attached to the diaphragm and its other end connected to a block C10 secured thereto, a spring C11 surrounding the rod C9 and having engagement at opposite ends thereof with the casing C2 and the block C10. The lower end of the rod C9 engages the relay core C12 which in turn is engaged by a spring C13 which possesses sufficient strength to normally raise the core C12 upward and thereby the rod C9 to cause the diaphragm C3 to be cupped upwardly whereby the air in the chamber C4 will flow through the passage C5 and will also raise the valve C7 and flow through the air outlet C6. The block C10 of the rod C9 of the relay is in engagement with a lever C14 pivoted at C15, and having engagement at one end thereof with a contact C16, due to the downward pull of the spring C17, to close a circuit between two conductors as shown. Upon energization of the relay coil C1, the relay core C12 will be urged downwardly and the pressure exerted on the rod C9 by the core C12 and spring C13 is released. At this time, the measured time delay operation is initiated as the compressed spring C11 may now apply force to the block C10, coupled to the diaphragm C3 through the rod C9, to urge the rod C9 downwardly, the rod C9 and thereby block C10 now moving downward at a rate determined by the movement of the diaphragm C3. The movement of this diaphragm is dependent on the entrance of air into the air chamber C4 through the restricted orifice or air inlet C5 in the casing C2, inasmuch as the valve C7 is closed which prevents air entering the passage C6, and the inlet C5 is the only possible passageway for the air to enter the chamber C4. It will be seen that the entrance of the air through the orifice C5 into the chamber C4 will take some time, in this case about two seconds, before the rod C9 and the block C10 will be lowered sufficiently to cause the lever C14 to be rotated by the block C10 to break the engagement of the lever C14 with the contact C16 and thereby the circuit through the conductors associated with the lever and the contact. Upon deenergization of the coil C1, the core C12 will be raised by the spring C13 to raise the rod C9 and the block C10 to cause the diaphragm to be cupped upwardly again, the movement of the block C10 permitting the spring C17 to effect rotation of the lever C14 about its pivot point C15 to engage the lever with the contact C16 to complete a circuit through the conductors associated with the lever and contact.

The timing relay C is operative to establish and maintain circuits hereinafter described for energizing the coil V1 of the solenoid-operated valve 98 and the coil X1 of the solenoid-operated valve 99 to cause the solenoid cores V3 and X3 to move the valve bodies 100 and 101 to direct pressure fluid to the cylinders 46 and 51 for actuating the pistons 45 and 50 therein to advance the tools toward the ends of the shaft and to move the piston 84 in cylinder 83 to retract shaft-locating rod 87 from the shaft. For this purpose, the closing of the switch D will, therefore, effect energization of the relay C which will maintain a circuit therethrough to energize the coils V1 and X1 of the solenoid-operated valves 98 and 99 for two seconds, at which time the circuit will be interrupted and other circuits established to continue the sequence of machine operations by switches closed by the racks 39 and 48a movable with the pistons 45 and 46 to effect actuation of these pistons and piston 84 for the purposes above described. The circuit for energizing the coil C1 of the relay C comprises the power supply-connected conductor T2, conductors C18 and C19, the coil C1 of the relay C, the wires C20 and C21, the closed contacts D8 of the starting box D', conductor D10, the closed switch D, the conductors D11 and D12 connected to the power supply-connected conductor T1. This energization of the coil C1 of the relay C will cause the core C12 to be pulled downwardly to start the timing period.

The relay F is simultaneously energized with the energization of the relay C to effect energization of the coil V1 of the solenoid-operated valve 98 and the coil X1 of the solenoid-operated valve 99 to cause the pressure fluid to actuate the pistons 45 and 50 and 84, to move the tools toward the ends of the shaft and to retract the locating rod from the engaged end of the shaft. The circuit for energizing the coil F1 of the relay F to effect movement of the core F2 and armatures F3 and F4 upward to close the contacts F5 and F6 of said relay comprises the conductor T2, conductors C18 and F7, the coil F1 of the relay F, conductor F8, contact C16 of the relay C, the lever C14 of said relay, conductor F9, conductors C20 and C21, the closed contact D8 of the starting box D', the conductor D10, the closed switch D, the conductors D11 and D12 and the conductor T1. As soon as the coil F1 of the relay F is energized and the core F2 and armatures F3 and F4 raised, the contacts F5 and F6 of said relay are closed and the closing of the contact F5 causes parallel circuits to be established to energize the coil V1 of the valve 98 and the coil X1 of the valve 99. The circuits for the coil V1 of the valve 98 and the coil X1 of the valve 99 comprise the conductors T1, D12, D11, F11, contacts F5 of the relay F, the conductor F12 to the conductor F13 connected to the coils V1 and X1 of the valves 98 and 99, conductors F14 and F15, the conductors F7 and C18 and the conductor T2.

It will be apparent from the foregoing that, upon closing of the switch D at the push button station I, circuits will be immediately established to simultaneously energize the relay D3 of the starting box D' to effect energization of the drive motor 26, the relay C will be energized as well as the coil F1 of the relay F to effect energization of the coils V1 and X1 of the solenoid-operated valves 98 and 99, respectively, to cause movement of the valve bodies 100 and 101, through the actuation of the cores V3 and X3 secured to said valve bodies, to direct the pressure fluid from the pump to the cylinders 46 and 51 to cause movement of the pistons 45 and 50 to advance the tools toward the ends of the shaft and to direct the fluid to the cylinder 83 to move the piston 84 to retract the shaft locating rod 87 from the shaft.

Referring to Fig. 2, it will be noted that the racks 39 and 48a, due to their connections with the pistons 45 and 51, will be moved by said pistons. Each of these racks is provided with laterally extending end projections or stops fixed thereto which are adapted respectively, to operate limit switches, disposed therebetween and fixed to the headstocks 4 and 5, at the beginning and end of the work operation, the rack 39 being provided with the stops 147 and 148 of which, in the retracted position of the piston 45, as shown in Fig. 6, the stop 148 is adapted to actuate push button K1 of the switch K against the closing action of its spring K3 to open the contacts K2 of said switch, and the stop 147 of the rack 39 being spaced from the push button M1 of the limit switch M so that the contacts M2 are opened by the associated spring M3. The rack 48a is provided with the projections or stops 149 and 150 adapted to receive therebetween and operate limit switches J and K, secured to the headstock 5. In the retracted position of the piston 50, the projection 149 of the rack 48a engages the push button J1 of the switch J to maintain the contacts J2 of said switch open despite the action of the spring J3 and the projection 150 is spaced from the push button L1 of the switch L so that the contacts L2 will be open due to the action of the spring L3.

Upon movement of the pistons 45 and 50 towards each other to move the tools into cutting engagement with the shaft, the stops 148 and 149 of the racks 39 and 48a, respectively will become disengaged from the push buttons of the switches K and J and their contacts K2 and J2 will be closed by their springs. At the end of the cutting and centering operations of the shafts, the stops 147 and 150 of the racks 39 and 48a will engage the push buttons M1 and L1 of the switches M and L, respectively, to close the contacts M2 and L2 against the action of the springs associated therewith.

As previously pointed out, the valves 98 and 99 become operative immediately upon the closing of the switch D at the push button station I by the relays and circuits hereinbefore described, and will direct the fluid pressure to the pistons 45 and 50 to move the same and thereby the racks 39 and 48a to effect advance of the tools toward and into engagement with the ends of the shaft. The movement of the racks is effective to cause the respective projections 148 and 149 thereof to become disengaged from the push buttons K1 and J1 of the switches K and J, respectively, whereby the contacts K2 and J2 of these switches will be closed to thereby establish circuits maintaining the sequence of operations of the machine.

It has been previously noted that holding circuits for maintaining the drive motor 26 continually operative are established after the switch D at the push button station I is released. An initial holding circuit is established upon energization of the coil F1 of the relay F through the contacts F6 of said relay, this circuit comprising the conductor T2, conductor D9, the relay coil D3 of the starting box D, contacts D8, conductor C21, conductor C20, contacts F6 of the relay F, conductor D13, the closed contacts at the left side of the stop switch U, conductors D11 and D12, to the conductor T1. This initial holding circuit is established momentarily but will remain effective until the tools move toward the shaft as the coil F1 of the relay F will become deenergized after two seconds due to the timing mechanism of the relay C operating to disengage the lever C14 from the contact C16 to break the circuit energizing the coil F1 of the relay F with consequent movement of the core F2 downward to open the contacts F6 of the relay F thereby interrupting this holding circuit. However, during this period of time, the pistons 45 and 50 have been actuated to move the tools toward the ends of the shaft and, as the racks 39 and 48a will also be moved, the stops 148 and 149 on the racks will become disengaged from the push buttons K1 and J1 of the switches K and J to effect closing of the contacts K2 and J2 of said switches to establish another circuit for maintaining the coil D3 of the starting box D' energized, this second holding circuit comprising the power supply-connected conductor T1, the conductors D12 and D11, the contacts at the left side of the stop switch U, the conductors D13 and D14, the closed contacts K2 and J2 of the switches K and J, respectively, the conductors D15, C20 and C21, closed contacts D8 and coil D3 of the starting box D', conductor D9 and the power supply-connected conductor T2. It will be apparent that this second holding circuit will be effective to maintain the relay coil D3 of the starting box D' continually energized and thereby cause the contacts D5, D6 and D7 to remain closed for maintaining the circuits for the drive motor 26 until the switches J and K are again engaged by the projections 148 and 149 of the racks 39 and 48a, respectively, at the end of the operation of the machine.

Resuming the description of the control of the operation of the machine, the tools are being moved toward and into engagement with the shaft to cut and center the ends of the shaft. At the initiation of the movement of the tools, a holding circuit for maintaining the coil C1 of the relay C energized has been established by the closing of the switches J and K, this circuit comprising the conductor T2 connected to the power source S, the conductor C18, the coil C1 of the relay C, the conductor C20, the conductor D15, the closed contacts K2 of the switch K and the contacts J2 of the switch J which are wired in parallel as indicated by the conductors D15 and D14, the conductor D14, conductor D13, the closed contacts of the stop switch U, the conductors D11, D12 and the conductor T1 connected to the power source S. During this advancing movement of the tools, the spring C11 of the timing relay C has moved the diaphragm C3, the rod C7 and the block C10 connected thereto so that the lever C14 is rotated to disengage the contact C16 to break the circuit energizing the coil F1 of the relay F which causes the core F2 to drop by gravity to open the contacts F5 and F6 of the relay F whereby the coil V1 of the valve 98 and the coil X1 of the valve 99 are deenergized.

Upon completion of the forward movement of the tools to cut and center the ends of the shaft as predetermined by the adjustment of the stops 4a and 4b of the headstocks for engaging the moving racks 39 and 48a and preventing further movement of the same, the projections 147 and 150 of the racks 39 and 48a, respectively, will engage the push buttons M1 and L1 of the switches M and L to close the contacts M2 and L2 of said switches. It will be apparent that one of the tools may complete its cutting and centering operation prior to that of the other tool on the ends of the shaft so that one of the contacts of the switches L or M will be closed before the contacts of the other switch. In the event the tool 30 should finish its cutting and centering operation on the associated end of the shaft prior to the completion of the cutting and centering operation of the tool 48 on its end of the shaft, the contacts M2 of the switch M will be closed to establish a circuit for energizing the coil E1 of the measured time relay E. It will be noted that the relay E is identical to the relay C and operates in a similar manner. The purpose of the relay E is to allow the tool 30 to remain in engagement with the associated end of the shaft for a period of time, such as two seconds, to cause the rotating tool to face the cut end of the shaft, or in other words to effect a polishing action on the cut end of the shaft to provide a smooth surface thereon, and thereafter, at the expiration of the time period, to establish a circuit for energizing the coil V2 of the valve 98 to effect movement of the valve body 100 to the left to direct the pressure fluid to the piston 45 to retract the tool 30 from the shaft.

For this purpose and the continuance of the automatic operation of the machine, the closing of the contacts M2 of the switch M establishes a circuit for energizing the coil E1 of the relay E, the circuit comprising the conductors T2, C18, C19, coil E1 of the relay E, conductor E2, the closed contacts M2 of the switch M, the conductors E3 and D12 to the conductor T1. Upon energization of the coil E1 of the relay E, the core E4 will be urged downwardly against the action of its spring E5 to set in operation the measured time delay mechanism of the relay for effecting engagement of the lever E5 with the contact E6 after a period of time, such as approximately two seconds, at which time circuits are established for energizing the coil V2 of the valve 98 to cause movement of the valve body to the left to direct fluid to the cylinder 46 to cause rearward movement of the piston 45 therein to retract the tool 30 from the shaft. During the measured time period, the facing operation on the cut end of the shaft is performed by the tool 30 and, at the expiration of the time period, a circuit is established by the engagement of the lever E5 with the contact E6 of the relay E to energize the coil G1 of the relay G which raises the core G2 to close the contacts G5 of the relay G to establish a circuit for energizing the solenoid coil V2 of the valve 98 to move the core V4 and thereby the valve body 100 of the valve 98 to the left to establish the aforesaid fluid circuit for retracting the tool 30 from the shaft. The circuit for energizing the coil G1 of the relay G comprises the conductor T2, the conductor C18, the conductor F7, the winding G1 of the relay G, the conductor G3, the contact E6 and lever E5 of the relay E, the conductor E2, the closed contacts M2 of the switch M, the conductors E3 and D12, and the conductor T1. The core G2 of the relay G is raised and the contacts G5 are closed to establish a circuit for energizing the coil V2 of the valve 98, the circuit comprising the conductor T1, conductors D12, D11, F11, the contacts G5 of the relay G, conductor G4, the coil V2 of the solenoid-operated valve 98, conductors F14, F15, F7, C18, and the conductor T2. The energization of the coil V2 will cause movement of the solenoid core V4 and the valve body 100 to the left whereby pressure fluid will flow to the cylinder 46 to move the piston 45 rearwardly of the cylinder to withdraw the tool 30 from its engagement with the shaft and to direct fluid to the cylinder 83 to move the piston 84 and thereby position the shaft-locating bar to its advanced position.

Referring now to the sequence of operations occuring at the completion of the cutting and centering operation of the tool 48 on the associated end of the shaft, the rack 48a will engage the stop 5a on the headstock 5 to prevent further movement of the tool and the projection 150 on the rack will contact the push button L1 of the switch L to thereby close the contacts L2 of said switch to establish a circuit energizing a measured time delay relay R identical with the relays C and E. Upon energization of the relay R, the timing mechanism of the relay will operate and, after a period of time, such as two seconds, during which the facing operation on the end of the shaft by the tool is performed, will complete a circuit for energizing the relay S which will establish another circuit for energizing the solenoid coil X2 of the valve 99 to move the core X4 and thereby valve body 101 to the right to direct pressure fluid to the cylinder 51 for actuating the piston 50 rearwardly of the cylinder to withdraw the tool 48 from the end of the shaft. Referring to the electrical circuits for effecting these results, the closing of the contact L2 of the switch L by the projection 150 of the rack 48a at the completion of the cutting and centering operation of the tool 48 on the associated end of the shaft will establish a circuit for energizing the coil R1 of the relay R. This circuit comprises the conductor T2, conductors C18 and C19, the coil R1 of the relay R, the conductors R2 and R3, the closed contacts L2 of the switch L, the conductors E3 and D12 to the conductor C1 whereupon the coil R1 of the relay R is energized to move the core R4 downward to permit the timing mechanism to become operative, the downward movement of the core R4 compressing the spring R5 therebeneath to allow expanding action of the diaphragm-actuating spring as governed by the flow of the air through the restricted orifice in the casing of the relay R. During the operation of the timing mechanism of the relay R, the rotating tool 48 will face the cut end of the shaft. After the lapse of a period of time, such as two seconds, the block R6 of the relay R will have moved down sufficiently to rotate the lever R7 to engage the lever with the contact R8 of said relay to establish a circuit for energizing the relay S. The circuit for energizing the coil S1 of the relay S to effect upward movement of the core S2 to close the contacts S3 of said relay comprises the conductors T2, C18, F7, coil S1 of the relay S, the conductor S4, the contact R8 and lever R7 of the relay R, the conductor R3, the closed contacts of the switch L, the conductors E3 and D12, and the conductor T1. Upon energization of the coil S1 of the relay S, the core S2 will be actuated to close the contacts S3 of said relay thereby establishing a circuit for energizing the coil X2 of the solenoid-operated valve 99. This circuit comprises the conductor T1, the conductors D12, D11, F11, the contacts S3 of the relay S, the conductor S5, the coil X2 of the valve 99, the conductors F14, F15, F7, C18, and the conductor T2.

Upon energization of the solenoid coil X2 of the valve 99, the core X4 of said valve and thereby the valve body 101, connected thereto, will be moved to the right to direct the pressure fluid to the cylinder 51 to effect actuation of the piston 50 therein toward the rear of the cylinder to retract the tool 48 from its engagement with the shaft.

It will be apparent that inasmuch as a different amount cutting is usually had on each end of the shaft, one of the tools 30 and 48 will usually complete its full cutting and centering stroke before the other tool so that actuation of the associated switch L or M will be had prior to the actuation of the other switch by the associated tool at the end of its cutting operation. Therefore, as above described, closing of the contacts of the switches L and M is usually independently effected to establish circuits for energizing the measured time relays E and R at different times so that one of the tools can face the end of the shaft in engagement therewith and be retracted while the other tool is still in cutting engagement with the other end of the shaft. However, the contacts of the switches L and M may be simultaneously closed without affecting the operation of the electrical controls as described.

Upon initial movement of the piston 50 to its retracted position, projection 159 of the rack 48a will be disengaged from the push button L1 of the switch L to cause opening of the contacts L2 of the switch L to deenergize the coil R1 of the measured time relay R inasmuch as the circuit for maintaining this coil energized includes the closed contacts L2 of the switch L as previously described. Upon deenergization of the relay R, the spring R5 of said relay will become operative to urge the core R4 upwardly to raise the associated rod and move the diaphragm to its upwardly cupped position so that the spring associated with the lever R6 will rotate the lever to disengage the lever from the contact R3 of the relay R. As the circuit for energizing the coil S1 of the relay S is dependent upon the engagement of the lever R7 and contact R8 of the relay R, the relay S will be deenergized whereby the core S2 thereof will drop downwardly to open the contacts S3 of said relay. As the energization of the coil X2 of the solenoid-operated valve 99 is dependent upon the contacts S3 being closed as before described, the coil X2 of said valve will be deenergized.

Upon initial movement of the piston 45 to its retracted position, projection 147 on the rack 39 will become disengaged from the push button M1 of the switch M whereby the contacts M2 of the switch will be opened by the spring M3. As these contacts, when closed, are in the circuit for energizing the relay E, the opening of these contacts will effect deenergization of the coil E1 of said relay to cause the spring E5 to urge the relay core E4 upward to move the diaphragm of the relay E to its upwardly cupped position. This movement will cause the lever E5 to be rotated by its spring to disengage the lever and contact E6, which will interrupt the circuit for energizing the coil G1 of the relay G with consequent opening of the contacts G5 of the relay G. The contacts G5 of the relay G when closed, are in the circuit for energizing the coil V2 of the valve 98 and, as these contacts are now open, the coil V2 of the valve 98 will be deenergized.

Upon completion of the movement of the pistons 45 and 50 to their retracted position shown in Figs. 1 and 6, the projections 148 and 149 of the racks 39 and 48a, respectively, will actuate the push button K1 of the switch K and the push button J1 of the switch J to open the contacts K2 and J2 of said switches to deenergize the various relays of the electrical control circuit instrumental in establishing circuits for effecting operation of the drive motor 26 and for controlling operation of the valves 98 and 99 to move the tools and the shaft-locating rod 87 to and from the shaft. This will stop the machine with the exception of the hydraulic motor and pump combination which will remain operative so that, upon removal of the finished shaft and insertion of another shaft in the machine, the drive button D at the push button station I may be pushed for the performance of the sequence of operations of the machine as previously described. It will be apparent that as the limit switches J and K are wired in parallel, as indicated by the conductors D14 and D15, opening of one of the switches will not break the described circuits for maintaining operative the drive motor 26 and for effecting the described sequence of operations of the machine and it will be necessary for both switches to be open to break the aforesaid circuits by deenergizing the relays establishing the same. Therefore, when both of the tools are in their retracted positions shown in Figs. 1 and 6 and the limit switches J and K are open, the relay coil D3 of the starting box D' for the drive motor 26 will be deenergized whereby the core D2 will move downward to open the contacts D5, D6 and D7 establishing the circuits between the power supply S and the motor to stop the motor for, as previously described, the second holding circuit for maintaining the coil D3 energized to render the drive motor 26 operative includes the closed contacts J2 and K2 of the switches J and K and accordingly, when the contacts are open, the coil D3 will be deenergized with consequent deenergization of the drive motor 26. Deenergization of the coil D3 will cause contacts D8 to open and, as these contacts, when closed, are in the circuit for energizing the coil C1 of the relay C, this relay will be deenergized and the spring C13 of the said relay will be operative to move the core C12 upward to thereby raise the rod C11 to return the diaphragm C3 to its upwardly cupped position and to effect movement of the lever C14 by the block C1 to engage the contact C16 of said relay.

Summarizing the sequence of operations of the machine, it will be seen from the foregoing description of the electrical control circuits that closing the switch H at the push button station I will establish circuits to start and maintain the motor 91 operative to drive the hydraulic pump 92 to provide pressure fluid for the fluid circuit. Thereafter, upon closing the switch D at the push button station I, circuits will be established between power supply lines and the windings of the drive motor 26 so that the motor will operate to rotate the tools. At the same time, circuits will be established for maintaining the motor 26 energized throughout the operation of the machine as well as for energizing the measured time delay relay C to override the limit switches J and K until the tools move toward the shaft by effecting energization of the relay F to establish a circuit to energize the coil X1 of the valve 99 and the coil V1 of the valve 98. As the energization of these last-mentioned coils will be effective to move the solenoid cores X3 and V3 and thereby the valve bodies 100 and 101 of the valves 98 and 99 to direct the flow of pressure fluid to the cylinders 46 and 51 to effect actuation of the pistons 45 and 50, respectively, therein so that the tools will be advanced into their cutting and centering engagement with the adjacent ends of the shaft and also to effect actuation of the piston 84 to retract the shaft-locating bar from the shaft. At the completion of the cutting and centering operation on the ends of the shaft by the tools, the switches L and M will be usually successively closed to effect circuits for energizing the measured time delay relays E and R which relays, after a predetermined time during which the tools are maintained in engagement with the ends of the shaft to face the same, will act to establish circuits for energizing the coils V2 and X2 of the solenoid-operated valves 98 and 99 to effect movement of the cores V4 and X4 and thereby the valve bodies 100 and 101 to direct the pressure fluid to the cylinders 46 and 51 to move the pistons 45 and 50 therein for retracting the tools from engagement with the ends of the shaft. Upon completion of the retracting movements of the pistons 45 and 50 and the tools, the limit switches J and K will be operated to break the circuits for the energization of the drive motor 26 to stop the operation of the machine, the limit switches L and M having been previously opened at the initiation of the retracting movement of the pistons 45 and 50 to deenergize the relays E and R and thereby the relays G and S which will effect deenergization of the solenoid coils V2 and X2 of the valves 98 and 99 whereby the valve bodies 100 and 101 will be maintained in position to direct the fluid to the cylinders 46 and 51 to maintain the pistons 45 and 50 therein and the tools in their retracted positions and also to direct fluid to the piston 83 to advance the rod 87 to its shaft-locating position.

In the event it is desired to stop the machine at any stage of its operation, the stop switch U at the push button station I may be opened which will effect stoppage of the machine by interrupting the circuits for the drive and hydraulic motors inasmuch as the stop switch U as previously described, when closed, is in the holding circuit for maintaining the hydraulic motor 91 operative, and is also in the second holding circuit for maintaining the drive motor 26 operative.

The electrical control circuits of the machine are provided with means providing motor overload protection operative to disconnect the power circuits from the windings of the motors, if either of the motors 26 or 91 draw more than normal line current. The means for providing overload protection for the motors is afforded by the fuses O and P of the starting box D' which are connected in series with the power supply lines L4, L5, and L6 and the wires T4, T5 and T6 connected to the windings of the motor 26, and also fuses Y and Z of the starting box H' which, as shown, are connected in series with the power supply lines L1, L2, L3 and the lines T1, T2, T3 connected to the windings of the motor 91. These fuses are of conventional type and are identical, each of these fuses comprising a heater element in series in the motor circuit and adapted to be heated when the motor draws more than line current, to cause movement of an adjacent bimetallic element in the starter control circuit for the other motor to interrupt this circuit with consequent denergization of the last-mentioned motor which, in turn, interrupts the starter control circuit for the remaining motor which is effective to deenergize this motor. Referring more particularly to the starting box H' for the motor 91, it will be seen that the heater elements Y1 and Z1 of the fuses Y and Z are respectively in series with the power supply lines L2 and L1 and the wires T2 and T1 leading to the windings of the motor 91. These heater elements are formed of a metal adapted to become heated upon the excessive flow of current, such as occurs upon an overload occurring on the motor 91, and will transfer the heat to the adjacent bimetallic elements Y2 and Z2 to cause these elements to move to interrupt the flow of current through the conductor H11 and, inasmuch as the conductor H11, is in the holding circuit for maintaining the coil H3 of the starting box H' energized, the coil H3 and thereby the core H4 will be deenergized and the contacts H7, H8 and H9 of the starting box H' will be opened to disconnect the power supply lines S from the windings of the motor 91. Also, upon opening of these contacts, it will be noted that the conductor D9 receives current from the conductor T2 leading to a winding of the motor 91 and, as this conductor D9 is in the circuit for energizing the relay coil D3, the coil D3, and thereby core D4 will be deenergized and the contacts D5, D6 and D7 of the starting box D' will open to interrupt the current flow from the power supply lines L4, L5, L6 to the conductors T4, T5, T6 connected to the windings of the motor 26. It will therefore be apparent that, upon an excessive current flow through the fuses Y and Z in the circuits from the power supply line to the windings of the motor 91, these circuits will be broken to stop the motor 91 and, as a consequence, the circuits between the power supply line and the winding of the motor 26 will be interrupted to stop the drive motor 26. In the event excessive current flow occurs in the power lines T4, T5 and T6 connected to the windings of the motor 26 by the motor draw more than normal current, the heaters O1 and P1 of the fuses O and P, respectively, in series with the conductors T4 and T5 will cause the bimetallic elements O2 and P2 of the fuses O and P, respectively, to move to interrupt the continuity of the current flow through the conductor H11. As this conductor H11 is in the holding circuit for maintaining the relay winding H3 of the starting box H' energized, this circuit will be interrupted with consequent deenergization of said relay winding H3 and the core H4 will drop by gravity to open the contacts H7, H8, H9 whereby the flow of current supply will be interrupted to the windings of the motor 91. Upon the opening of the contacts of the starting box H', the line T2 will fail to provide current from the power supply S to the conductor D9 which is in the holding circuit for energizing the coil D3 of the starting box D' with consequent deenergization of the coil D3 and movement of the core D4 by gravity to open the contacts D5, D6 and D7 of the starting box D' to interrupt the flow of current from the power supply line L4, L5, L6 to the conductors T4, T5, T6 connected to the windings of the drive motor 26. It will thus be noted that in the event either motor 26 or 91 draws more than normal line current, the fuses connected in series with the power supply wires and the wires leading to the windings of the overloaded motor will be operative to interrupt the circuits for both of the relays in the starting box D' and H' to effect opening of the contacts breaking the continuity of flow of the current from the power supply lines to the windings of both motors.

From the foregoing description it is apparent a shaft cutting and centering machine is provided incorporating electrical means effective to automatically control the various stages of the work operations of the machine and thereafter deenergize the operating mechanism of the machine at the end of the work operations while providing instrumentalities operative to stop the operating mechanism automatically at any stage of the work operations in the event of an excess flow of energy and also to stop the operating mechanism manually at the will of the operator.

While the embodiment of the invention herein disclosed constitutes a preferred form, it is to be understood that other forms might be

We claim:

1. In a machine for cutting the ends of shafts of different lengths to provide shafts of uniform length, means to support a shaft; a cutter at each end of said shaft; means mounting each cutter for rotation and for movement to and from the adjacent shaft end; means for locating one of said shaft ends a predetermined fixed distance from one of said cutters, said locating means being movable toward and away from said shaft for engaging said one end of said shaft; a source of pressure fluid; first and second pressure-fluid operated motors respectively connected to said cutter-mounting means for moving said cutter-mounting means toward and away from said shaft ends to advance and retract the cutters associated therewith relative to said shaft ends; a third pressure fluid-operated motor for moving said locating means toward and away from shaft-locating position; a single valve controlling pressure fluid from said source to both said third motor and said first motor, and operative in one position thereof to direct pressure fluid to the first and third motors to effect movement of said locating means toward shaft-locating position and the one of said cutters associated with said first motor away from the adjacent shaft end and operative in another position thereof to effect movement of said locating means away from shaft-locating position and said one cutter toward the adjacent end of said shaft; a second valve operative in one position thereof to control pressure fluid from said source to said second motor to move its associated cutter toward the adjacent shaft end, said second valve being operative in another position thereof for controlling pressure fluid to said second motor to move its associated cutter away from the adjacent shaft end; and electrical control means connected with said valves including elements for effecting movement of said valves from one position to another.

2. In a machine for cutting the ends of shafts of different lengths to provide shafts of uniform length, means to support a shaft; a cutter at each end of said shaft; means mounting each cutter for rotation and for movement to and from the adjacent shaft end; means for locating one of said shaft ends a predetermined fixed distance from one of said cutters, said locating means being movable toward and away from said shaft for engaging said one end of said shaft; a source of pressure fluid; first and second pressure-fluid operated motors respectively connected to said cutter-mounting means for moving said cutter-mounting means toward and away from said shafts ends to advance and retract the cutters associated therewith relative to said shaft ends; a third pressure fluid-operated motor for moving said locating means toward and away from shaft-locating position; a single valve controlling pressure fluid from said source to both said third motor and said first motor, and operative in one position thereof to direct pressure fluid to the first and third motors to effect movement of said locating means toward shaft-locating position and the one of said cutters associated with said first motor away from the adjacent shaft end and operative in another position thereof to effect movement of said locating means away from shaft-locating position and said one cutter toward the adjacent end of said shaft; a second valve operative in one position thereof to control pressure fluid from said source to said second motor to move its associated cutter toward the adjacent shaft end, said second valve being operative in another position thereof for controlling pressure fluid to said second motor to move its associated cutter away from the adjacent shaft end; and means controlling the operation of said valves including electrical circuits having two pairs of solenoids connected therein, one pair of solenoids being connected with said single valve and the other pair connected with said second valve and arranged to effect movement of the respective valves from said one position to the other.

CHARLES FREDERICK CRAWFORD.
HALLIE ALTON POTTS.
GEORGE V. PRICE.

REFERENCES CITED

The following references are of record in the file of this patent:

UNITED STATES PATENTS

| Number | Name | Date |
| --- | --- | --- |
| 680,724 | Mussetter et al. | Aug. 20, 1901 |
| 1,700,668 | Damerell | Jan. 29, 1929 |
| 1,972,595 | Libby | Sept. 4, 1934 |
| 1,975,250 | Calipha et al. | Oct. 2, 1934 |
| 1,978,879 | Ferris et al. | Oct. 30, 1934 |
| 2,051,052 | Morgan | Aug. 18, 1936 |
| 2,084,562 | Schafer | June 22, 1937 |
| 2,108,779 | Schafer et al. | Feb. 15, 1938 |